United States Patent
Gu et al.

(10) Patent No.: US 11,434,147 B2
(45) Date of Patent: Sep. 6, 2022

(54) VANADIUM OXIDE POWDER WITH HIGH PHASE-TRANSITION LATENT HEAT AND PREPARATION METHOD THEREOF

(71) Applicant: University of Electronic Science and Technology of China, Sichuan (CN)

(72) Inventors: Deen Gu, Sichuan (CN); Yatao Li, Sichuan (CN); Yadong Jiang, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 303 days.

(21) Appl. No.: 16/871,037

(22) Filed: May 10, 2020

(65) Prior Publication Data
US 2020/0270144 A1    Aug. 27, 2020

(30) Foreign Application Priority Data
Aug. 21, 2019   (CN) .......................... 201910771292.1

(51) Int. Cl.
*H01M 4/02*   (2006.01)
*C01G 31/02*  (2006.01)
*C08L 39/06*  (2006.01)

(52) U.S. Cl.
CPC .............. *C01G 31/02* (2013.01); *C08L 39/06* (2013.01); *C01P 2002/70* (2013.01)

(58) Field of Classification Search
CPC ....................................................... H01M 4/02
See application file for complete search history.

(56) References Cited

U.S. PATENT DOCUMENTS 4,965,150 A * 10/1990 Dahn .................. H01M 10/052
                                                    423/594.17
6,156,395 A * 12/2000 Zhang .................. C23C 16/405
                                                    427/126.3

* cited by examiner

*Primary Examiner* — Jacob B Marks

(57) ABSTRACT

A preparation method of a vanadium oxide powder with high phase-transition latent heat includes steps of taking vanadium pentoxide, oxalic acid and PVP as raw materials, preparing a B-phase $VO_2$ nano-powder modified by the PVP, and then annealing the B-phase $VO_2$ nano-powder modified by the PVP at high temperature in an oxygen atmosphere, and obtaining the vanadium oxide powder with high phase-transition latent heat which includes M-phase $VO_2$ with a mass percentage in a range of 96-99% and $V_6O_{13}$ with a mass percentage in a range of 1-4%, and has the phase-transition latent heat larger than 50 J/g. Compared with the vanadium oxide powder prepared by a traditional method without PVP modification and using a vacuum annealing process, the phase-transition latent heat of the vanadium oxide powder provided by the present invention is increased by at least 60%.

20 Claims, 6 Drawing Sheets

Intensity (a.u.)

Intensity (a.u.)

Intensity (a.u.)

Intensity (a.u.)

VANADIUM OXIDE POWDER WITH HIGH PHASE-TRANSITION LATENT HEAT AND PREPARATION METHOD THEREOF

CROSS REFERENCE OF RELATED APPLICATION

The present invention claims priority under 35 U.S.C. 119(a-d) to CN201910771292.1, filed Aug. 21, 2019.

BACKGROUND OF THE PRESENT INVENTION

Field of Invention

The present invention relates to the field of thermochromic material technology, and more particularly to a vanadium oxide powder with high phase-transition latent heat and a preparation method thereof.

Description of Related Arts

The thermochromic coating is an intelligent thermal control coating that automatically adjusts the thermal control parameters such as its solar transmittance according to the temperature change of the coating to achieve the thermal control technology for controlling the temperature of the object. Its core is thermochromic material. At present, the application research about thermochromic coating technology mainly focuses on several thermochromic materials including inorganic phase transition materials represented by $VO_2$ and polymer materials represented by liquid crystal or thermosensitive polymer. Among them, $VO_2$ thermochromic coating has good transparency, low preparation cost, reversible phase transition, fast response, and phase transition temperature close to room temperature, and is able to actively and intelligently adjust characteristics such as the infrared transmittance of coating materials, so that it has become one of the important technical trends of temperature-controlling coatings such as smart windows.

The thermochromic ability of $VO_2$ mainly originates from the semiconductor-to-metal transition (SMT) of $VO_2$. The SMT of $VO_2$ is a reversible first-order phase transition. Before and after the SMT, the electrical and optical properties of $VO_2$ are abruptly changed in nanoseconds, in which the sudden increase of carrier concentration across the SMT causes a jump in resistivity or conductivity, and optical properties of $VO_2$ such as the refractive index n, the reflectivity R, the transmittance T, and the absorptance A vary significantly in the infrared band across the phase transition. These superior properties make $VO_2$ show great prospects in practical applications, and have aroused widespread interest from researchers all over the world. For thermochromic applications, when the temperature is lower than the SMT temperature, $VO_2$ is a monoclinic semiconductor state with a higher infrared transmittance, and when the temperature is higher than the SMT temperature, $VO_2$ is converted to a metal state having a tetragonal phase with a low infrared transmittance. Based on this performance, $VO_2$ coating is promising for intelligently adjusting the indoor temperature. In addition, the abrupt change of electrical properties due to the SMT also indicates the potential of $VO_2$ in the field of electrical switches and optical storage.

The phase transition properties of $VO_2$ are closely related to its structure. The typical SMT temperature of single crystal $VO_2$ is about 68° C. Near this temperature, the temperature change of less than 1° C. causes its resistivity modulation amplitude achieve a mutation of up to 5 orders of magnitude (D. Brassard, et al., *Appl. Phys. Lett.*, 2005, 87, 051910). The phase transition characteristics of polycrystalline $VO_2$, such as the SMT temperature, phase transition amplitude, and phase transition hysteresis width, are quite different from those of single crystal. For example, polycrystalline $VO_2$ typically has a lower phase transition amplitude and a wider phase transition hysteresis width (J. B. Kana Kana, et al., *Optical Materials*, 2010, 32, 739-742; J. Y. Suh, et al., *Journal of Applied Physics*, 2004, 96, 1209), which is mainly related to the large number of grain boundaries and limited grain integrity in polycrystalline $VO_2$. The lattice distortion at the grain boundary causes the discontinuousness of phase transition between the grains, resulting in a decrease in the phase transition amplitude and a widening of the phase transition hysteresis. Generally, for the $VO_2$ powder, the parameter that directly reveals the phase transition modulation ability is the phase-transition latent heat. For the single crystal $VO_2$, the phase-transition latent heat for the SMT is the energy required for the lattice structure transition of $VO_2$ from monoclinic phase to tetragonal phase. The phase-transition latent heat of polycrystalline $VO_2$ is lower than that of single crystal $VO_2$ because the grain boundaries do not participate in the lattice structure transition, which results in the phase transition modulation capability of the polycrystalline $VO_2$ is also lower than that of the single crystal $VO_2$. However, the preparation process of the single crystal $VO_2$ is complicated and high in cost. Therefore, most studies on thermochromic $VO_2$ coatings focus on the advanced preparation technologies of polycrystalline $VO_2$.

The fabrication skills for the polycrystalline $VO_2$ powders are of two kinds (Ming Li, et al., *Small*, 2017, 13, 1701147; M. J. Powell, et al., *Nanoscale*, 2015, 7, 18686): (1) One is to directly obtain the monoclinic $VO_2$ powder by means of hydrothermal synthesis, thermal decomposition, and so forth. This approach requires very strict control of the preparation process and a narrow process window, and is not easy to obtain a high quality monoclinic phase $VO_2$. (2) Another is two-step approach that B-phase $VO_2$ (denoted as $VO_2(B)$) powders are firstly prepared by hydrothermal synthesis, thermal decomposition, chemical precipitation, sol-gel method, etc., then $VO_2(B)$ powders are annealed in vacuum, or inert atmosphere to obtain monoclinic $VO_2$ (denoted as $VO_2(M)$) powders. For this approach, the preparation process of the $VO_2(B)$ powders is simple and easy to be implemented. The process parameters are adjustable within a relatively-wide range, But the products after annealing often contain the B-phase $VO_2$ or other vanadium oxide phases with lower valence state, resulting in poor phase-transition performance of the products.

For the above problems in the existing preparation technology of $VO_2$ powders with high thermochromic performance, CN108892172A discloses a method for preparing $VO_2$ powders with high phase-transition latent heat through annealing $VO_2(B)$ powders at a short-time oxygen atmosphere and then in-situ vacuum, which obtains the high-purity M-phase $VO_2$ powder, thereby increasing the phase-transition latent heat of the powders. However, the phase-transition latent heat of the prepared $VO_2$ powder does not exceed 40 J/g. The present invention intends to provide a preparation method to obtain a vanadium oxide powder having a higher phase-transition latent heat.

SUMMARY OF THE PRESENT INVENTION

In view of the above description, a technical problem to be solved of the present invention is to provide a vanadium oxide powder with high phase-transition latent heat and a preparation method thereof.

To solve the above technical problem, the present invention adopts technical solutions as follows.

A vanadium oxide powder with high phase-transition latent heat comprises M-phase $VO_2$ with a mass percentage in a range of 96-99% and $V_6O_{13}$ with a mass percentage in a range of 1-4%.

Also, the present invention provides a preparation method of the vanadium oxide powder with high phase-transition latent heat, which comprises steps of:

(S1) taking polyvinylpyrrolidone (PVP) as a surfactant and preparing a PVP-modified $VO_2$(B) powder which is a B-phase $VO_2$ nano-powder modified by the PVP; and (S2) annealing the PVP-modified $VO_2$(B) powder at high temperature in an oxygen atmosphere, thus obtaining the vanadium oxide powder with high phase-transition latent heat.

Further, the step of (S1) comprises:

(S11) preparing a uniform precursor dispersion which comprises adding a certain amount of deionized water to $V_2O_5$ (vanadium pentoxide) and $H_2C_2O_4$ (oxalic acid), and then firstly stirring, and then adding PVP with a certain mass percentage, and then finally obtaining the uniform precursor dispersion after secondly stirring at room temperature, wherein:

mass percentages of the PVP, the vanadium pentoxide and the oxalic acid are respectively in a range of 0.03-0.08%, 0.60-1.00% and 0.45-0.75% of a total weight of the precursor dispersion;

(S12) preparing a suspension by a hydrothermal process which comprises adding the uniform precursor dispersion obtained by (S11) to an autoclave liner, performing hydrothermal reaction at 220-240° C. for 4-8 h, cooling to room temperature and obtaining the suspension; and (S13) drying a precipitate at low temperature after centrifugating the suspension obtained by the step of (S12), washing the precipitate and obtaining the PVP-modified $VO_2$(B) powder.

Preferably, the oxalic acid is anhydrous oxalic acid or oxalic acid dihydrate which is a common oxalic acid hydrate.

Further, in the step of (S11), the first stir is performed at room temperature for 1-3 h, and the second stir is performed at room temperature for 5-15 min.

Further, in the step of (S12), a filled ratio of the precursor dispersion in the autoclave liner is in a range of 35-45%.

Further, in the step of (S13), drying the precipitate at 50-80° C. for 12-24 h.

Further, the step of (S2) comprises:

(S21) degassing the PVP-modified $VO_2$(B) powder in a furnace at vacuum having a pressure of less than 20 Pa and at room temperature for 30-80 min;

(S22) maintaining the vacuum, increasing the temperature at a rate in a range of 3-5° C./min from room temperature to $T_1$, and maintaining at $T_1$ for 30-60 min;

(S23) introducing oxygen with a certain flow after increasing the temperature at a rate in a range of 12-15° C./min from $T_1$ to $T_2$, maintaining the oxygen flow, and maintaining the temperature at $T_2$ for 45-90 min; and (S24) immediately stopping introducing oxygen, then decreasing the temperature to be below 80° C., and obtaining the vanadium oxide powder with high phase-transition latent heat.

Further, in the step of (S22), $T_1$ is in a range of 100-150° C.

Further, in the step of (S23), $T_2$ is in a range of 580-620° C.

Further, in the step of (S23), the oxygen flow is in a range of 1.5-2.0 sccm (standard cubic centimeter per minute).

The present invention has beneficial effects as follows.

(1) High phase-transition latent heat: The present invention provides a vanadium oxide powder with high phase-transition latent heat, which comprises M-phase $VO_2$ and $V_6O_{13}$ with a mass percentage in a range of 1-4%, and has the phase-transition latent heat larger than 50 J/g.

(2) Simple and unique process:

The preparation method of the vanadium oxide powder with high phase-transition latent heat provided by the present invention comprises steps of firstly preparing a PVP-modified $VO_2$(B) powder through taking the PVP as a surfactant, and then annealing the PVP-modified $VO_2$(B) powder at high temperature in an oxygen atmosphere, and finally obtaining the vanadium oxide powder with high phase-transition latent heat.

According to the preparation method of the vanadium oxide powder with high phase-transition latent heat provided by the present invention, in the process of preparing the PVP-modified $VO_2$(B) powder, it is not conventionally to firstly prepare the B-phase $VO_2$ nano-powder and then modify its surface thereof with the PVP, but instead, firstly preparing a uniform precursor dispersion through mixing vanadium pentoxide, oxalic acid, PVP and deionized water, and then preparing the PVP-modified $VO_2$(B) powder through a hydrothermal reaction.

Different from the traditional vacuum annealing process, according to the preparation method provided by the present invention, the PVP-modified $VO_2$(B) powder is firstly degassed at vacuum, and then annealed in a segmented manner under an oxygen atmosphere for obtaining the vanadium oxide powder with high phase-transition latent heat.

Compared with a preparation method of a $VO_2$ powder with high phase-transition latent heat disclosed by a cited relevant document CN108892172A, the preparation method provided by the present invention comprises steps of firstly using vanadium pentoxide, oxalic acid and PVP as raw materials to prepare the PVP-modified $VO_2$(B) powder, and then annealing through annealing the PVP-modified $VO_2$(B) powder in a segmented manner under an oxygen atmosphere at vacuum, and finally obtaining the vanadium oxide powder with high phase-transition latent heat. Moreover, compared with the preparation method disclosed by the cited relevant document CN108892172A, the vanadium oxide powder prepared by the method provided by the present invention also contains 1-4% of $V_6O_{13}$ by weight besides the M-phase $VO_2$, but its phase-transition latent heat is higher than the high-purity M-phase $VO_2$ powder prepared by the method disclosed by CN108892172A.

(3) Simple reaction conditions and low cost:

Raw materials, such as vanadium pentoxide, oxalic acid and PVP, adopted by the present invention are low in cost. The vanadium oxide powder prepared by the method provided by the present invention has high phase-transition latent heat; compared with the vanadium oxide powder prepared by a traditional method without PVP modification and using a vacuum annealing process, its phase-transition latent heat is increased by at least 60%. Moreover, the preparation method provided by the present invention has simple reaction conditions and is conducive to mass production.

BRIEF DESCRIPTION OF THE DRAWINGS

FIG. 1-2 is an XRD pattern of vanadium oxide powders (VO—R) obtained by the preparation method according to the control example.

FIG. 2-1 is an XRD pattern of B-phase $VO_2$ powders modified by PVP ($VO_2(B)$—PVP-1) obtained by the preparation method according to the first embodiment of the present invention.

FIG. 2-2 is an XRD pattern of vanadium oxide powders (VO—PVP-1) obtained by the preparation method according to the first embodiment of the present invention.

FIG. 3-1 is an XRD pattern of B-phase $VO_2$ powders modified by PVP ($VO_2(B)$—PVP-2) obtained by the preparation method according to the second embodiment of the present invention.

FIG. 3-2 is an XRD pattern of vanadium oxide powders (VO—PVP-2) obtained by the preparation method according to the second embodiment of the present invention.

FIG. 4-1 is an XRD pattern of B-phase $VO_2$ powders modified by PVP ($VO_2(B)$—PVP-3) obtained by the preparation method according to the third embodiment of the present invention.

FIG. 4-2 is an XRD pattern of vanadium oxide powders (VO—PVP-3) obtained by the preparation method according to the third embodiment of the present invention.

FIG. 5-1 is an XRD pattern of B-phase $VO_2$ powders modified by PVP ($VO_2(B)$—PVP-4) obtained by the preparation method according to the fourth embodiment of the present invention.

FIG. 5-2 is an XRD pattern of vanadium oxide powders (VO—PVP-4) obtained by the preparation method according to the fourth embodiment of the present invention.

FIG. 6-1 is an XRD pattern of B-phase $VO_2$ powders modified by PVP ($VO_2(B)$—PVP-5) obtained by the preparation method according to the fifth embodiment of the present invention.

FIG. 6-2 is an XRD pattern of vanadium oxide powders (VO—PVP-5) obtained by the preparation method according to the fifth embodiment of the present invention.

DETAILED DESCRIPTION OF THE PREFERRED EMBODIMENT

In order to better explain the present invention, the present invention is further verified by embodiments combined with accompanying drawings as follows.

Control Example

Adding 40 ml of deionized water to 0.364 g of vanadium pentoxide and 0.378 g of oxalic acid dihydrate, stirring at room temperature for 2 h, obtaining a uniform precursor dispersion with a mass concentration of the vanadium pentoxide and the oxalic acid of 0.890/% and 0.66%, respectively, putting the precursor dispersion into a 100 ml of para-polyphenol (PPL) liner, putting the liner with the precursor dispersion into an autoclave, cooling to room temperature after performing hydrothermal reaction at 240° C. for 4 h, obtaining a suspension, centrifugating the suspension and washing the precipitate, drying the precipitate at 80° C. for 12 h in an oven, and finally obtaining a nano-$VO_2(B)$ powder without PVP addition (which is recorded as $VO_2(B)$-1).

Putting 0.2 g $VO_2(B)$-1 into a furnace, vacuumizing for degassing it at vacuum having a pressure of less than 20 Pa and at room temperature for 30 min, increasing a temperature of the furnace from the room temperature to 120° C. at a rate of 3° C./min, keeping the temperature at 120° C. for 40 min, and then increasing the temperature from 120° C. to 600° C. at a rate of 13° C./min, keeping the temperature at 600° C. for 60 min under vacuum, and then naturally cooling to the room temperature, and finally obtaining a control vanadium oxide powder being annealed, which is recorded as VO—R. The control vanadium oxide powder acts as a control sample of the present invention for distinguishing the technical effects.

Figure 1:
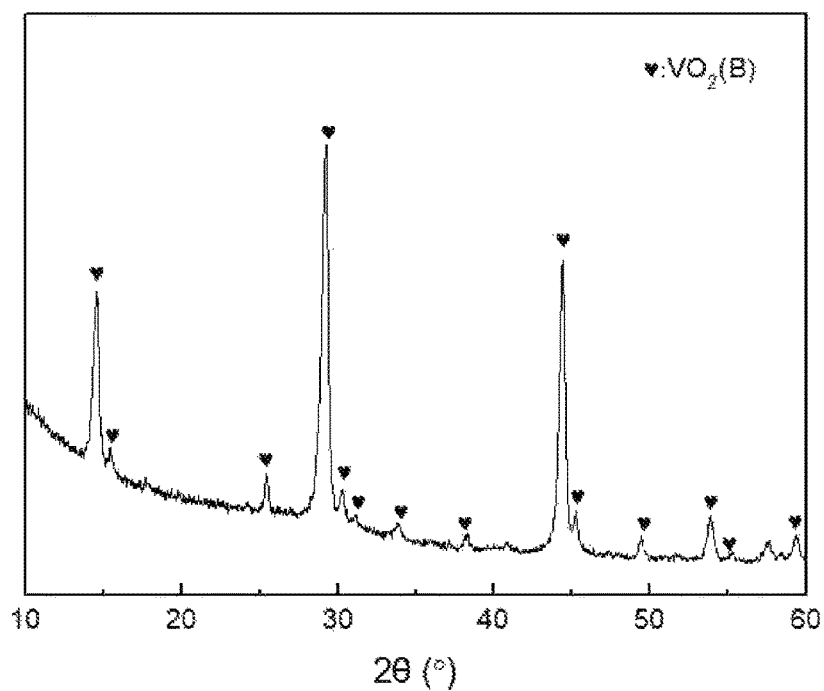
FIG. 1-1 is an XRD (X-ray diffraction) pattern of B-phase $VO_2$ powders ($VO_2$(B)-1) obtained by the preparation method according to the control example.
Figures 1, 2:
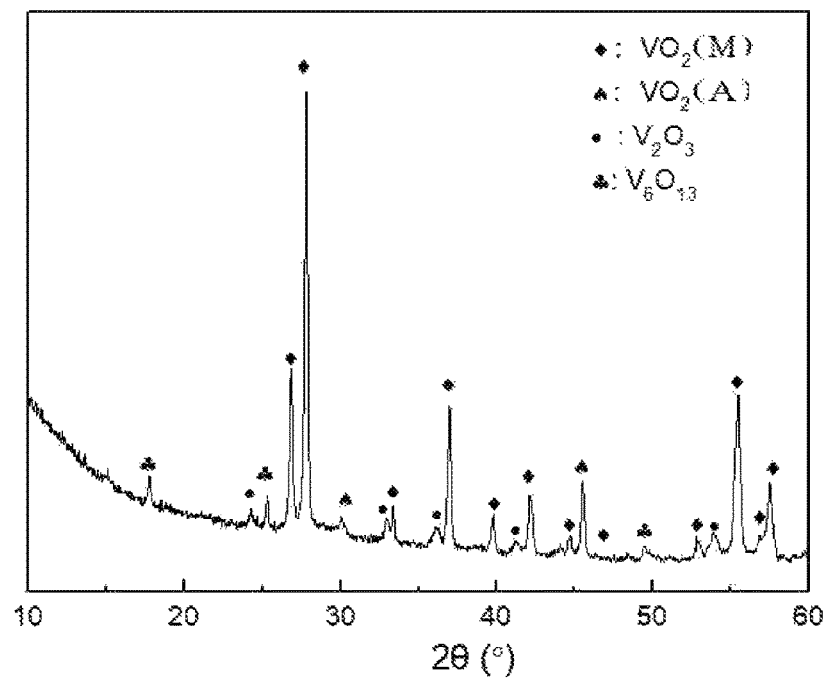
Figures 1, 2:
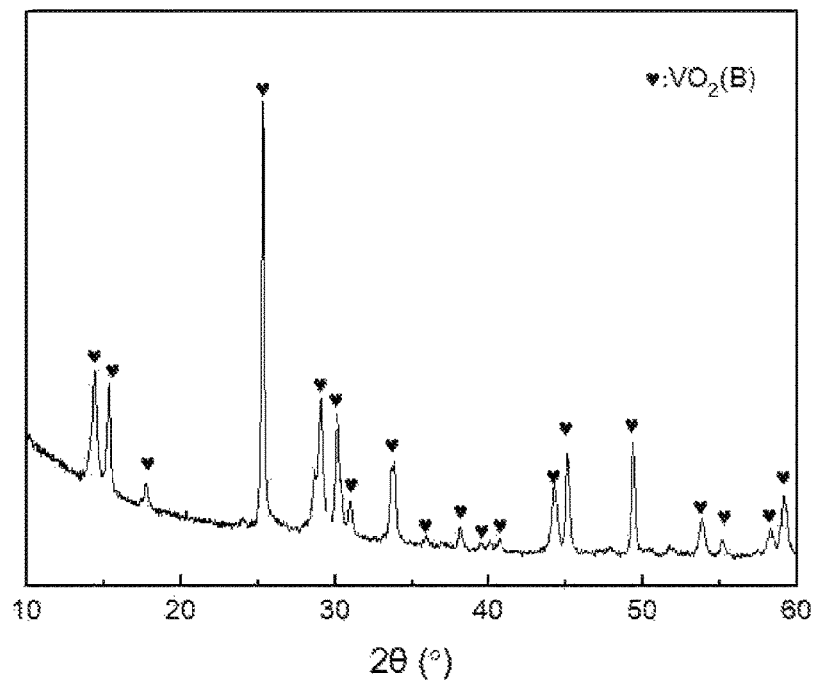
Figure 2:
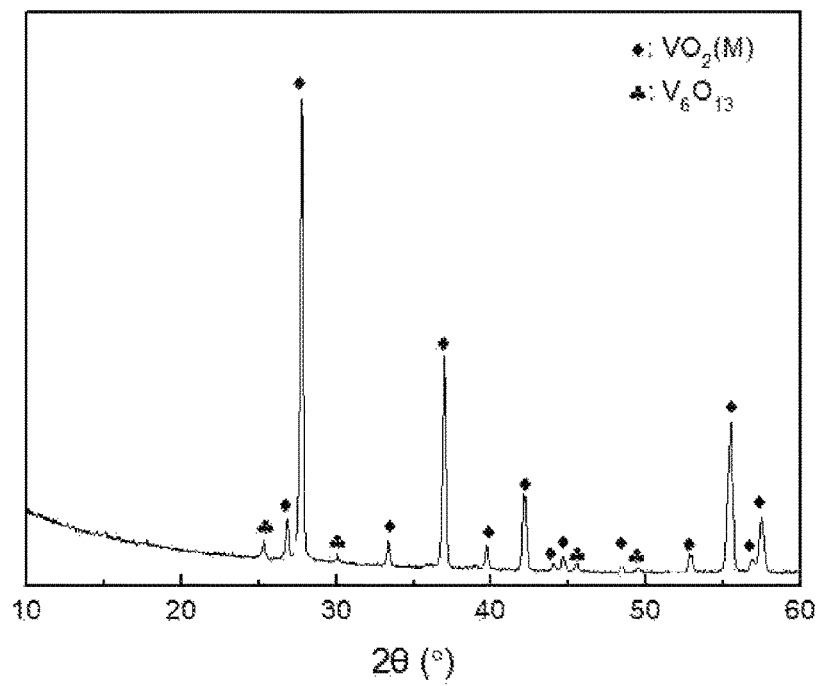

An XRD (X-ray diffraction) analysis test is performed on the prepared $VO_2(B)$-1 and VO—R, respectively, as shown in FIG. 1-1 and FIG. 1-2. Differential scanning calorimetry (DSC) analysis is performed on the sample VO—R at a temperature increase rate of 10° C./min to obtain the phase-transition latent heat of the VO—R. The relevant results are shown in Table 1.

TABLE 1

| DSC Test Results of VO-R Provided by the Control Example | |
|---|---|
| Sample | phase-transition latent heat (J/g) |
| VO-R | 30.95 |

It can be seen from FIG. 1-1 that $VO_2(B)$-1 is a typical B-phase $VO_2$.

As shown in FIG. 1-2, the diffraction peak of the VO—R with the largest diffraction intensity is consistent with the diffraction peak of the monoclinic phase $VO_2$, which shows that most of the $VO_2(B)$ powder after annealing treatment is converted into the monoclinic phase $VO_2$ (i.e., M-phase $VO_2$), and the $VO_2(B)$ powder also contains A-phase $VO_2$, $V_2O_3$ and $V_6O_{13}$.

First Embodiment

Adding 35 ml of deionized water to 0.335 g of vanadium pentoxide and 0.249 g of anhydrous oxalic acid, stirring at room temperature for 1 h, adding 0.013 g of PVP (polyvinylpyrrolidone), stirring for 15 min, obtaining a uniform precursor dispersion with a mass concentration of the PVP, the vanadium pentoxide and the oxalic acid of 0.037%, 0.94% and 0.70%, respectively, putting the precursor dispersion into a 100 ml of para-polyphenol (PPL) liner, putting the liner with the precursor dispersion into an autoclave, cooling to room temperature after performing hydrothermal reaction at 220° C. for 8 h, obtaining a suspension, centrifugating the suspension and washing the precipitate, drying the precipitate at 50° C. for 20 h in an oven, and finally obtaining a nano-$VO_2(B)$ powder modified by the PVP (which is recorded as $VO_2(B)$—PVP-1).

Putting 0.2 g $VO_2(B)$—PVP-1 into a furnace, vacuumizing it for degassing at vacuum having a pressure of less than 20 Pa and at room temperature for 80 min, increasing a temperature of the furnace from the room temperature to 100° C. at a rate of ° C./min, keeping the temperature at 100° C. for 60 min, and then immediately introducing oxygen with 99.9% concentration at a flow of 1.8 sccm after increasing the temperature from 100° C. to 580° C. at a rate of 15° C./min, keeping the temperature at 580° C. in the oxygen atmosphere for 70 min, and then stopping introducing oxygen, keeping vacuum, and then naturally cooling to the room temperature, and finally obtaining a vanadium oxide powder being annealed, which is recorded as VO—PVP-1.

An XRD (X-ray diffraction) analysis test is performed on the prepared $VO_2(B)$—PVP-1 and VO—PVP-1, respectively, as shown in FIG. 2-1 and FIG. 2-2. Differential scanning calorimetry (DSC) analysis is performed on the VO—PVP-1 at a temperature increase rate of 10° C./min to obtain the phase-transition latent heat of the VO—PVP-1. The relevant results are shown in Table 2.

TABLE 2

DSC Test Results of VO-PVP-1 Provided by the First Embodiment

| Sample | phase-transition latent heat (J/g) |
|---|---|
| VO-PVP-1 | 51.72 |

The result shows that compared with the control sample VO—R, most of the diffraction peaks of the VO—PVP-1 are consistent with the diffraction peaks of the monoclinic phase $VO_2$ (i.e., M-phase $VO_2$), and there are also a small amount of diffraction peaks from $V_6O_{13}$, which means that the $VO_2(B)$—PVP-1 powder modified by the PVP is converted into the monoclinic phase $VO_2$ (i.e., M-phase $VO_2$) and a small amount of $V_6O_{13}$ after annealing treatment at high temperature in the oxygen atmosphere.

According to the integral intensity A1 of the main diffraction peak from (011) plane of $VO_2(M)$ and the integral intensity A2 of the main diffraction peak from (110) plane of $V_6O_{13}$, a percentage of the $V_6O_{13}$ phase is calculated to be 3.3% based on a formula of $X=A2\times100\%/(A1+A2)$. Meanwhile, the phase-transition latent heat of the VO—PVP-1 obtained by the first embodiment is 1.67 times that of VO—R.

Second Embodiment

Adding 40 ml of deionized water to 0.364 g of vanadium pentoxide and 0.378 g of oxalic acid dihydrate, stirring at room temperature for 2 h, adding 0.017 g of PVP (polyvinylpyrrolidone), stirring for 10 min, obtaining a uniform precursor dispersion with a mass concentration of the PVP, the vanadium pentoxide and the oxalic acid of 0.042%, 0.89% and 0.66%, respectively, putting the precursor dispersion into a 100 ml of para-polyphenol (PPL) liner, putting the liner with the precursor dispersion into an autoclave, cooling to room temperature after performing hydrothermal reaction at 240° C. for 4 h, obtaining a suspension, centrifugating the suspension and washing the precipitate, drying the precipitate at 80° C. for 12 h in an oven, and finally obtaining a nano-$VO_2(B)$ powder modified by the PVP (which is recorded as $VO_2(B)$—PVP-2).

Putting 0.2 g $VO_2(B)$—PVP-2 into a furnace, vacuumizing it for degassing at vacuum having a pressure of less than 20 Pa and at room temperature for 30 min, increasing a temperature of the furnace from the room temperature to 120° C. at a rate of 3° C./min, keeping the temperature at 120° C. for 40 min, and then immediately introducing oxygen with 99.9% concentration at a flow of 1.5 sccm after increasing the temperature from 120° C. to 600° C. at a rate of 13° C./min, keeping the temperature at 600° C. in the oxygen atmosphere for 60 min, and then stopping introducing oxygen, keeping vacuum, and then naturally cooling to the room temperature, and finally obtaining a vanadium oxide powder being annealed, which is recorded as VO—PVP-2.

Figures 1, 3:
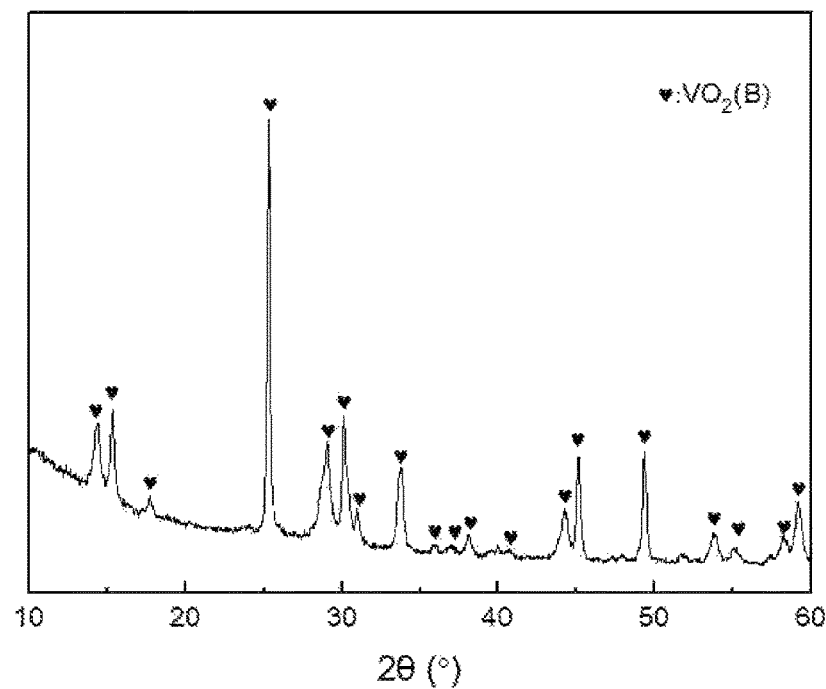
Figures 2, 3:
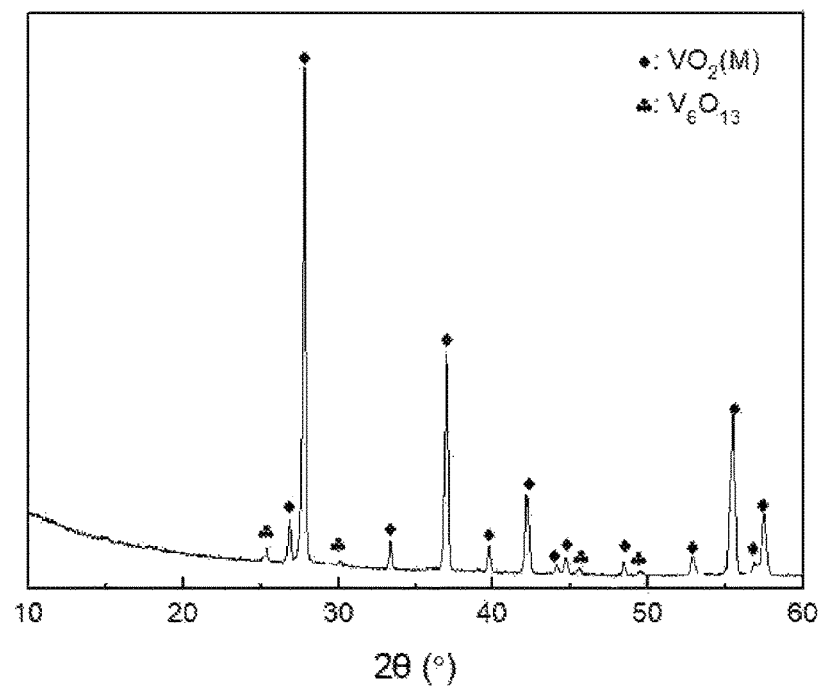

An XRD (X-ray diffraction) analysis test is performed on the prepared $VO_2(B)$—PVP-2 and VO—PVP-2, respectively, as shown in FIG. 3-1 and FIG. 3-2. Differential scanning calorimetry (DSC) analysis is performed on the VO—PVP-2 at a temperature increase rate of 10° C./min to obtain the phase-transition latent heat of the VO—PVP-2. The relevant results are shown in Table 3.

TABLE 3

DSC Test Results of VO-PVP-2 Provided by the Second Embodiment

| Sample | phase-transition latent heat (J/g) |
|---|---|
| VO-PVP-2 | 54.92 |

The result shows that compared with the control sample VO—R, most of the diffraction peaks of the VO—PVP-2 are consistent with the diffraction peaks of the monoclinic phase $VO_2$ (i.e., M-phase $VO_2$), and there are also a small amount of diffraction peaks from $V_6O_{13}$, which means that the $VO_2(B)$—PVP-2 powder modified by the PVP is converted into the monoclinic phase $VO_2$ (i.e., M-phase $VO_2$) and a small amount of $V_6O_{13}$ after annealing treatment at high temperature in the oxygen atmosphere. Referring to the method provided by the first embodiment, the percentage of $V_6O_{13}$ is calculated to be 2.4%. Meanwhile, the phase-transition latent heat of the VO—PVP-2 obtained by the second embodiment is 1.77 times that of VO—R.

Third Embodiment

Adding 45 ml of deionized water to 0.345 g of vanadium pentoxide and 0.359 g of oxalic acid dihydrate, stirring at room temperature for 3 h, adding 0.022 g of PVP (polyvinylpyrrolidone), stirring for 15 min, obtaining a uniform precursor dispersion with a mass concentration of the PVP, the vanadium pentoxide and the oxalic acid of 0.048%, 0.75% and 0.56%, respectively, putting the precursor dispersion into a 100 ml of para-polyphenol (PPL) liner, putting the liner with the precursor dispersion into an autoclave, cooling to room temperature after performing hydrothermal reaction at 230° C. for 6 h, obtaining a suspension, centrifugating the suspension and washing the precipitate, drying the precipitate at 70° C. for 16 h in an oven, and finally obtaining a nano-$VO_2(B)$ powder modified by the PVP (which is recorded as $VO_2(B)$—PVP-3).

Putting 0.2 g $VO_2(B)$—PVP-3 into a furnace, vacuumizing it for degassing at vacuum having a pressure of less than 20 Pa and at room temperature for 80 min, increasing a temperature of the furnace from the room temperature to 150° C. at a rate of 4° C./min, keeping the temperature at 150° C. for 30 min, and then immediately introducing oxygen with 99.9% concentration at a flow of 1.6 sccm after increasing the temperature from 150° C. to 620° C. at a rate of 12° C./min, keeping the temperature at 620° C. in the oxygen atmosphere for 50 min, and then stopping introducing oxygen, keeping vacuum, and then naturally cooling to the room temperature, and finally obtaining a vanadium oxide powder being annealed, which is recorded as VO—PVP-3.

Figures 1, 4:
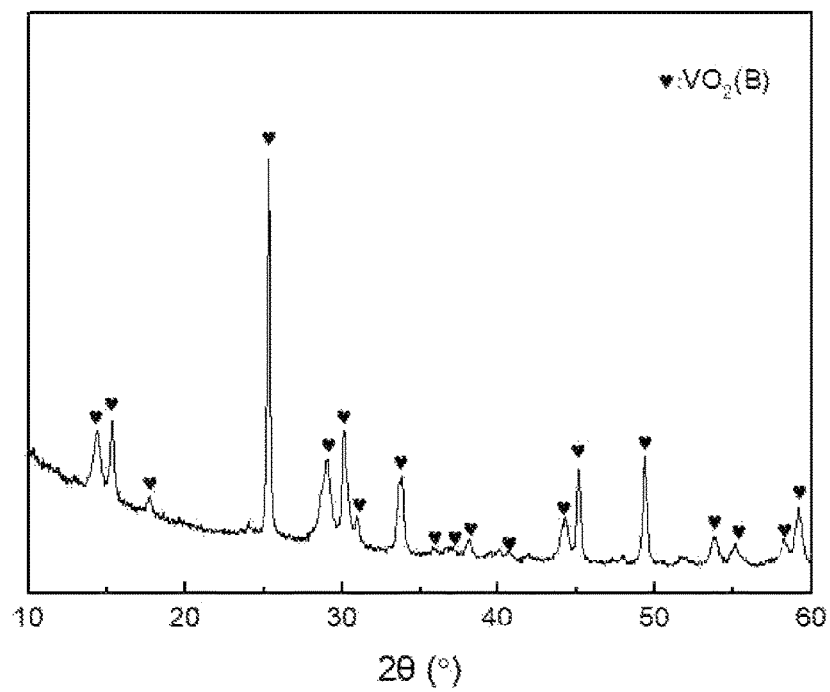
Figures 2, 4:
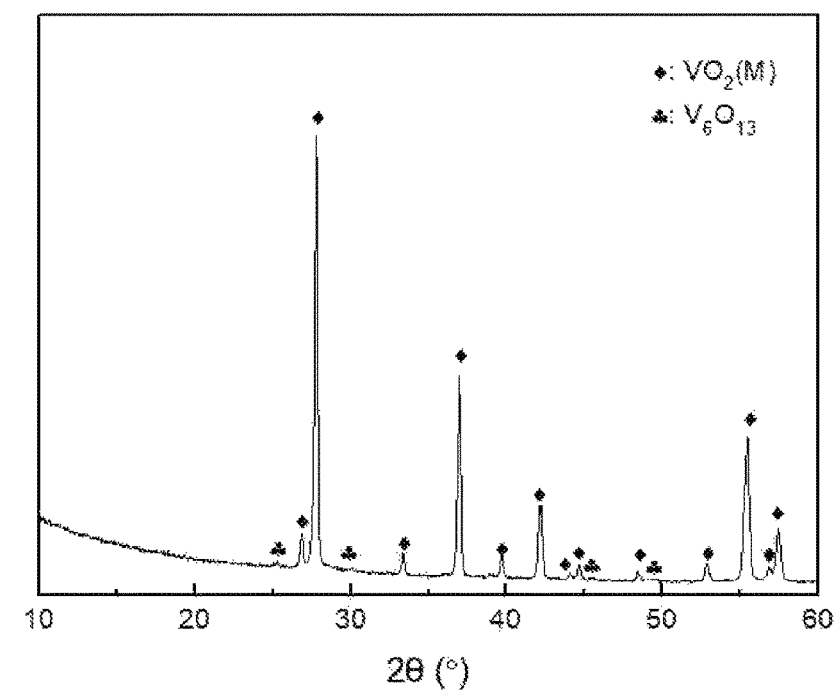

An XRD (X-ray diffraction) analysis test is performed on the prepared $VO_2(B)$—PVP-3 and VO—PVP-3, respectively, as shown in FIG. 4-1 and FIG. 4-2. Differential scanning calorimetry (DSC) analysis is performed on the VO—PVP-3 at a temperature increase rate of 10° C./min to obtain the phase-transition latent heat of the VO—PVP-3. The relevant results are shown in Table 4.

TABLE 4

DSC Test Results of VO-PVP-3 Provided by the Third Embodiment

| Sample | phase-transition latent heat (J/g) |
| --- | --- |
| VO-PVP-3 | 52.52 |

The result shows that compared with the control sample VO—R, most of the diffraction peaks of the VO—PVP-3 are consistent with the diffraction peaks of the monoclinic phase $VO_2$ (i.e., M-phase $VO_2$), and there are also a small amount of diffraction peaks from $V_6O_{13}$, which means that the $VO_2(B)$—PVP-3 powder modified by the PVP is converted into the monoclinic phase $VO_2$ (i.e., M-phase $VO_2$) and a small amount of $V_6O_{13}$ after annealing treatment at high temperature in the oxygen atmosphere. Referring to the method provided by the first embodiment, the percentage of $V_6O_{13}$ is calculated to 1.2%. Meanwhile, the phase-transition latent heat of the VO—PVP-3 obtained by the third embodiment is 1.70 times that of VO—R.

Fourth Embodiment

Adding 35 ml of deionized water to 0.325 g of vanadium pentoxide and 0.241 g of anhydrous oxalic acid, stirring at room temperature for 1 h, adding 0.028 g of PVP (polyvinylpyrrolidone), stirring for 5 min, obtaining a uniform precursor dispersion with a mass concentration of the PVP, the vanadium pentoxide and the oxalic acid of 0.079%, 0.91% and 0.68%, respectively, putting the precursor dispersion into a 100 ml of para-polyphenol (PPL) liner, putting the liner with the precursor dispersion into an autoclave, cooling to room temperature after performing hydrothermal reaction at 220° C. for 8 h, obtaining a suspension, centrifugating the suspension and washing the precipitate, drying the precipitate at 60° C. for 20 h in an oven, and finally obtaining a nano-$VO_2(B)$ powder modified by the PVP (which is recorded as $VO_2(B)$—PVP-4).

Putting 0.2 g $VO_2(B)$—PVP-4 into a furnace, vacuumizing it for degassing at vacuum having a pressure of less than 20 Pa and at room temperature for 60 min, increasing a temperature of the furnace from the room temperature to 100° C. at a rate of ° C./min, keeping the temperature at 100° C. for 60 min, and then immediately introducing oxygen with 99.9% concentration at a flow of 1.7 sccm after increasing the temperature from 100° C. to 580° C. at a rate of 15° C./min, keeping the temperature at 580° C. in the oxygen atmosphere for 80 min, and then stopping introducing oxygen, keeping vacuum, and then naturally cooling to the room temperature, and finally obtaining a vanadium oxide powder being annealed, which is recorded as VO—PVP-4.

Figures 1, 5:
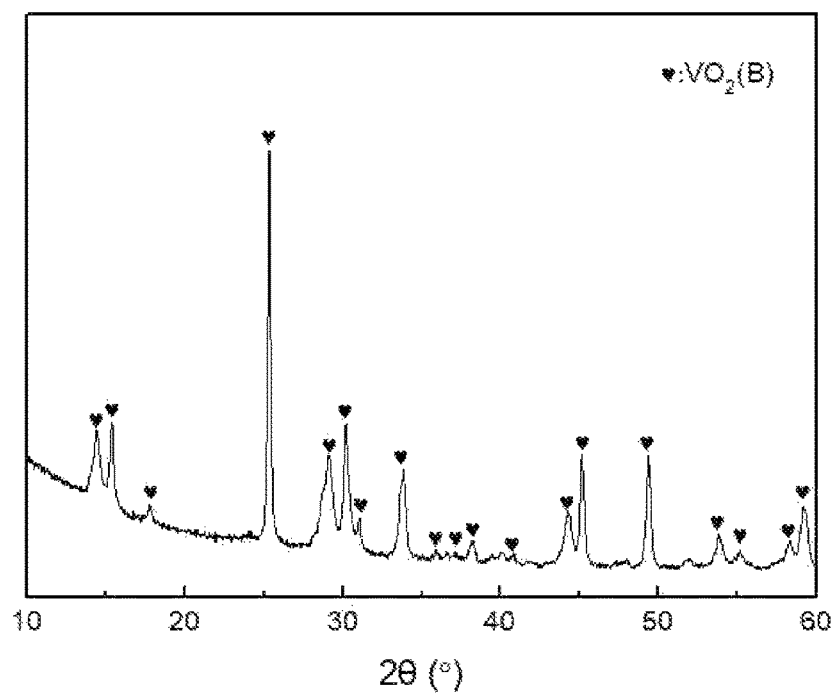
Figures 2, 5:
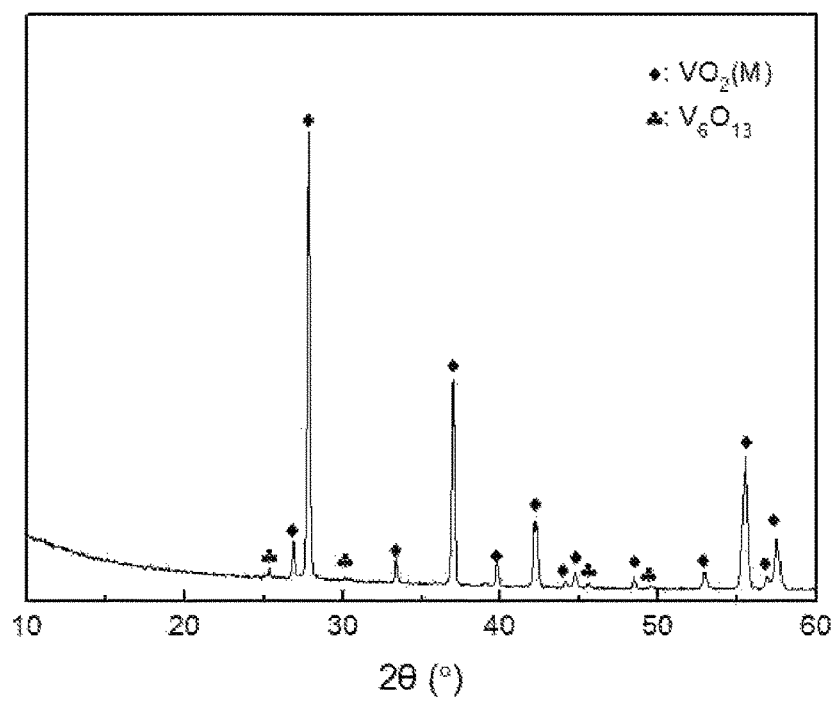

An XRD (X-ray diffraction) analysis test is performed on the prepared $VO_2(B)$—PVP-4 and VO—PVP-4, respectively, as shown in FIG. 5-1 and FIG. 5-2. Differential scanning calorimetry (DSC) analysis is performed on the VO—PVP-3 at a temperature increase rate of 10° C./min to obtain the phase-transition latent heat of the VO—PVP-4. The relevant results are shown in Table 5.

TABLE 5

DSC Test Results of VO-PVP-4 Provided by the Fourth Embodiment

| Sample | phase-transition latent heat (J/g) |
| --- | --- |
| VO-PVP-4 | 50.66 |

The result shows that compared with the control sample VO—R, most of the diffraction peaks of the VO—PVP-4 are consistent with the diffraction peaks of the monoclinic phase $VO_2$ (i.e., M-phase $VO_2$), and there are also a small amount of diffraction peaks from $V_6O_{13}$, which means that the $VO_2(B)$—PVP-4 powder modified by the PVP is converted into the monoclinic phase $VO_2$ (i.e., M-phase $VO_2$) and a small amount of $V_6O_{13}$ after annealing treatment at high temperature in the oxygen atmosphere. Referring to the method provided by the first embodiment, the percentage of $V_6O_{13}$ is calculated to 1.5%. Meanwhile, the phase-transition latent heat of the VO—PVP-4 obtained by the fourth embodiment is 1.64 times that of the reference VO—R.

Fifth Embodiment

Adding 45 ml of deionized water to 0.355 g of vanadium pentoxide and 0.264 g of anhydrous oxalic acid, stirring at room temperature for 3 h, adding 0.033 g of PVP (polyvinylpyrrolidone), stirring for 15 min, obtaining a uniform precursor dispersion with a mass concentration of the PVP, the vanadium pentoxide and the oxalic acid of 0.072%, 0.78% and 0.58%, respectively, putting the precursor dispersion into a 100 ml of para-polyphenol (PPL) liner, putting the liner with the precursor dispersion into an autoclave, cooling to room temperature after performing hydrothermal reaction at 230° C. for 6 h, obtaining a suspension, centrifugating the suspension and washing the precipitate, drying the precipitate at 70° C. for 24 h in an oven, and finally obtaining a nano-$VO_2(B)$ powder modified by the PVP (which is recorded as $VO_2(B)$—PVP-5).

Putting 0.2 g $VO_2(B)$—PVP-5 into a furnace, vacuumizing it for degassing at vacuum having a pressure of less than 20 Pa and at room temperature for 60 min, increasing a temperature of the furnace from the room temperature to 150° C. at a rate of 4° C./min, keeping the temperature at 150° C. for 30 min, and then immediately introducing oxygen with 99.9% concentration at a flow of 2.0 sccm after increasing the temperature from 150° C. to 620° C. at a rate of 12° C./min, keeping the temperature at 620° C. in the oxygen atmosphere for 90 min, and then stopping introducing oxygen, keeping vacuum, and then naturally cooling to the room temperature, and finally obtaining a vanadium oxide powder being annealed, which is recorded as VO—PVP-5.

Figures 1, 6:
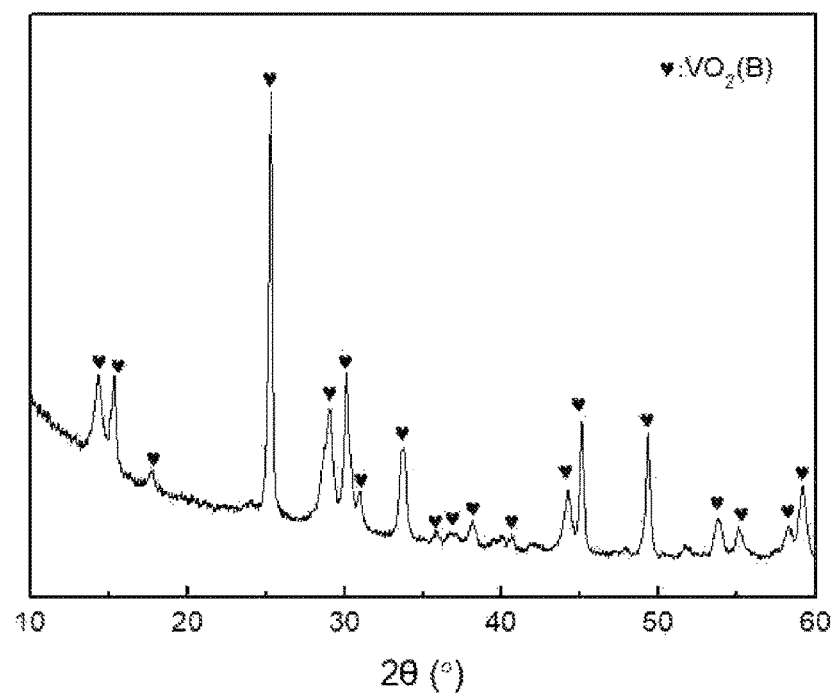
Figures 2, 6:
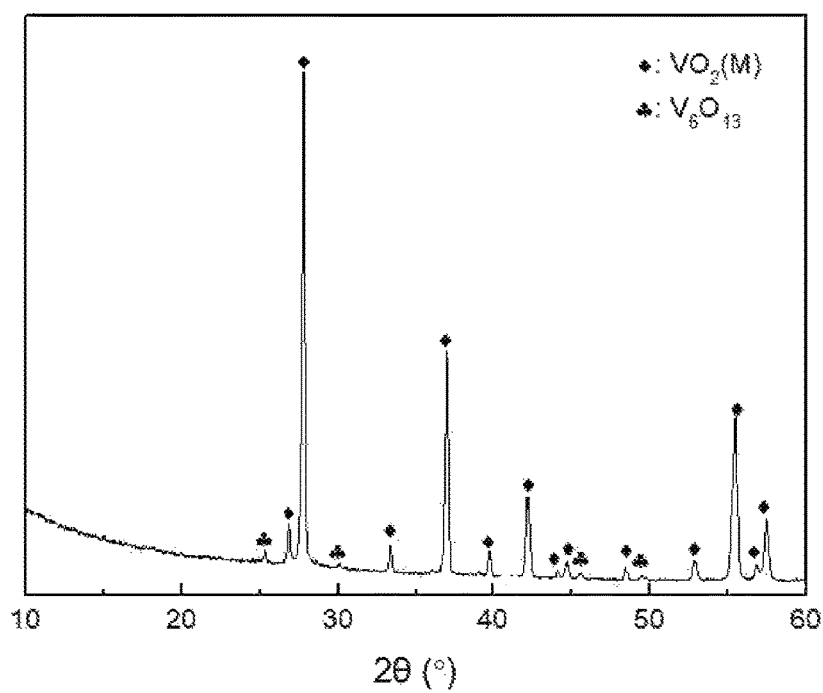

An XRD (X-ray diffraction) analysis test is performed on the prepared $VO_2(B)$—PVP-5 and VO—PVP-5, respectively, as shown in FIG. 6-1 and FIG. 6-2. Differential scanning calorimetry (DSC) analysis is performed on the VO—PVP-3 at a temperature increase rate of 10° C./min to obtain the phase-transition latent heat of the VO—PVP-5. The relevant results are shown in Table 6.

TABLE 6

DSC Test Results of VO-PVP-5 Provided by the Fifth Embodiment

| Sample | phase-transition latent heat (J/g) |
|---|---|
| VO-PVP-5 | 50.29 |

The result shows that compared with the control sample VO—R, most of the diffraction peaks of the VO—PVP-5 are consistent with the diffraction peaks of the monoclinic phase $VO_2$ (i.e., M-phase $VO_2$), and there are also a small amount of diffraction peaks from $V_6O_3$, which means that the $VO_2(B)$—PVP-5 powder modified by the PVP is converted into the monoclinic phase $VO_2$ (i.e., M-phase $VO_2$) and a small amount of $V_6O_{13}$ after annealing treatment at high temperature in the oxygen atmosphere. Referring to the method provided by the first embodiment, the percentage of $V_6O_{13}$ is calculated to 1.7%. Meanwhile, the phase-transition latent heat of the VO—PVP-5 obtained by the fifth embodiment is 1.63 times that of VO—R.

In summary, it can be known that:

(1) The preparation method provided by the control example is to provide the vanadium oxide powder without being modified by PVP and using vacuum a vacuum annealing process, the obtained vanadium oxide powder contains A-phase $VO_2$, $V_2O_3$ and $V_6O_{13}$ besides M-phase $VO_2$, and has the phase-transition latent heat of only 30.95 J/g.

(2) Compared with the preparation method provided by the control example, the preparation methods provided by the first, second, third, fourth and fifth embodiments are to fabricate the vanadium oxide powder with high phase-transition latent heat by preparing the B-phase $VO_2$ powder modified by PVP and then annealing at high temperature in an oxygen atmosphere. From the compositions of the samples and data of the phase-transition latent heat provided by all the embodiments, within the preferred values of each process parameter, the phase-transition latent heat of the vanadium oxide powder prepared by the first, second, third, fourth and fifth embodiments reaches 50 J/g, which is increased by at least 60% compared with that of the vanadium oxide powder prepared by the control example. Moreover, the vanadium oxide powder products fabricated by the preparation methods provided by the first, second, third, fourth and fifth embodiments only contain M-phase $VO_2$ and a small amount of $V_6O_{13}$ with a mass percentage in a range of 1 to 4%.

The above are specific embodiments of the present invention, but are not intended to limit the present invention. Therefore, it should be noted that any modifications and improvements made by the present invention are intended to be within the protective scope of the present invention.

What is claimed is:

1. A vanadium oxide powder, which comprises M-phase $VO_2$ with a mass percentage in a range of 96-99% and $V_6O_{13}$ with a mass percentage in a range of 1-4%.

2. A preparation method of a vanadium oxide powder, which comprises steps of:
   (S1) taking PVP (polyvinylpyrrolidone) as a surfactant and preparing a PVP-modified $VO_2(B)$ powder which is a B-phase $VO_2$ nano-powder modified by the PVP; and
   (S2) annealing the PVP-modified $VO_2(B)$ powder in an oxygen atmosphere, and obtaining the vanadium oxide powder, which comprises M-phase $VO_2$ with a mass percentage in a range of 96-99% and $V_6O_{13}$ with a mass percentage in a range of 1-4%.

3. The preparation method, as recited in claim 2, wherein: the step of (S1) comprises:
   (S11) preparing a uniform precursor dispersion which comprises adding deionized water to $V_2O_5$ (vanadium pentoxide) and $H_2C_2O_4$ (oxalic acid), and then firstly stirring, and then adding the PVP, and then finally obtaining the uniform precursor dispersion after secondly stirring at room temperature, wherein:
   mass percentages of the PVP, the vanadium pentoxide and the oxalic acid are respectively in a range of 0.03-0.08%, 0.60-1.00% and 0.45-0.75% of a total weight of the precursor dispersion;
   (S12) preparing a suspension by a hydrothermal process which comprises adding the uniform precursor dispersion obtained by the step of (S11) to an autoclave liner, performing hydrothermal reaction at 220-240° C. for 4-8 h, cooling to room temperature and obtaining the suspension; and
   (S13) drying a precipitate after centrifugating the suspension obtained by the step of (S12), washing the precipitate, and obtaining the PVP-modified $VO_2(B)$ powder.

4. The preparation method, as recited in claim 3, wherein: in the step of (S11), the first stir is performed at room temperature for 1-3 h, and the second stir is performed at room temperature for 5-15 min.

5. The preparation method, as recited in claim 3, wherein: in the step of (S12), a filled ratio of the precursor dispersion in the autoclave liner is in a range of 35-45%.

6. The preparation method, as recited in claim 4, wherein: in the step of (S12), a filled ratio of the precursor dispersion in the autoclave liner is in a range of 35-45%.

7. The preparation method, as recited in claim 3, wherein: in the step of (S13), drying the precipitate at 50-80° C. for 12-24 h.

8. The preparation method, as recited in claim 4, wherein: in the step of (S13), drying at 50-80° C. for 12-24 h.

9. The preparation method, as recited in claim 2, wherein: the step of (S2) comprises:
   (S21) degassing the PVP-modified $VO_2(B)$ powder in a furnace at vacuum having a pressure of less than 20 Pa and at room temperature for 30-80 min;
   (S22) maintaining the vacuum, increasing the temperature at a rate in a range of 3-5° C./min from room temperature to $T_1$, and maintaining the temperature at $T_1$ for 30-60 min;
   (S23) introducing oxygen after increasing the temperature at a rate in a range of 12-15° C./min from $T_1$ to $T_2$, maintaining an oxygen flow, and maintaining the temperature at $T_2$ for 45-90 min; and
   (S24) immediately stopping introducing oxygen, decreasing the temperature to be below 80° C., and obtaining the vanadium oxide powder.

10. The preparation method, as recited in claim 3, wherein: the step of (S2) comprises:
   (S21) degassing the PVP-modified $VO_2(B)$ powder in a furnace at vacuum having a pressure of less than 20 Pa and at room temperature for 30-80 min;
   (S22) maintaining the vacuum, increasing the temperature at a rate in a range of 3-5° C./min from room temperature to $T_1$, and maintaining the temperature at $T_1$ for 30-60 min;
   (S23) introducing oxygen after increasing the temperature at a rate in a range of 12-15° C./min from $T_1$ to $T_2$, maintaining an oxygen flow, and maintaining the temperature at $T_2$ for 45-90 min; and (S24) immediately stopping introducing oxygen, decreasing the temperature to be below 80° C., and obtaining the vanadium oxide powder.

11. The preparation method, as recited in claim 4, wherein: the step of (S2) comprises:
  (S21) degassing the PVP-modified $VO_2(B)$ powder in a furnace at vacuum having a pressure of less than 20 Pa and at room temperature for 30-80 min;
  (S22) maintaining the vacuum, increasing the temperature at a rate in a range of 3-5° C./min from room temperature to $T_1$, and maintaining the temperature at $T_1$ for 30-60 min;
  (S23) introducing oxygen after increasing the temperature at a rate in a range of 12-15° C./min from $T_1$ to $T_2$, maintaining an oxygen flow, and maintaining the temperature at $T_2$ for 45-90 min, and
  (S24) immediately stopping introducing oxygen, decreasing the temperature to be below 80° C., and obtaining the vanadium oxide powder.

12. The preparation method, as recited in claim 9, wherein: in the step of (S22), $T_1$ is in a range of 100–150° C.

13. The preparation method, as recited in claim 10, wherein: in the step of (S22), $T_1$ is in a range of 100–150° C.

14. The preparation method, as recited in claim 11, wherein: in the step of (S22), $T_1$ is in a range of 100–150° C.

15. The preparation method, as recited in claim 12, wherein: in the step of (S23), $T_2$ is in a range of 580–620° C.

16. The preparation method, as recited in claim 13, wherein: in the step of (S23), $T_2$ is in a range of 580–620° C.

17. The preparation method, as recited in claim 14, wherein: in the step of (S23), $T_2$ is in a range of 580–620° C.

18. The preparation method, as recited in claim 15, wherein: in the step of (S23), the oxygen flow is in a range of 1.5-2.0 sccm (standard cubic centimeter per minute).

19. The preparation method, as recited in claim 16, wherein: in the step of (S23), the oxygen flow is in a range of 1.5-2.0 sccm (standard cubic centimeter per minute).

20. The preparation method, as recited in claim 17, wherein: in the step of (S23), the oxygen flow is in a range of 1.5-2.0 sccm (standard cubic centimeter per minute).

* * * * *